US010283129B1

(12) United States Patent
Sharifi et al.

(10) Patent No.: US 10,283,129 B1
(45) Date of Patent: May 7, 2019

(54) AUDIO MATCHING USING TIME-FREQUENCY ONSETS

(71) Applicant: Google Inc., Mountain View, CA (US)

(72) Inventors: Matthew Sharifi, Zurich (CH); Richard Francis Lyon, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 23 days.

(21) Appl. No.: 15/273,598

(22) Filed: Sep. 22, 2016

Related U.S. Application Data

(63) Continuation of application No. 13/418,334, filed on Mar. 12, 2012, now Pat. No. 9,471,673.

(51) Int. Cl.
*G10L 19/02* (2013.01)
*G10L 25/54* (2013.01)

(52) U.S. Cl.
CPC ............. *G10L 19/02* (2013.01); *G10L 25/54* (2013.01)

(58) Field of Classification Search
CPC .... G06F 17/00; G06F 17/18; G06F 17/30017; G06F 17/3002; G06F 17/30023; G06F 17/30029; G06F 17/3033; G06F 17/30743; G06F 17/30761; G06F 17/30784; G06F 17/30799; G06F 21/10; G06K 9/00; G06K 9/00744; G06K 9/00758; G06K 9/62; G06T 9/002; G06T 9/005; G10H 2210/061; G10L 19/00; G10L 19/018; G10L 25/18; G10L 25/48; G10L 25/51; G10L 25/54; G11B 27/034; G11B 27/28; H04H 20/14; H04H 60/37; H04H 60/372; H04H 60/375; H04H 60/58; H04H 60/59; H04H 60/64; H04H 2201/90; H04L 2209/60; H04N 21/26603; H04N 21/4394; Y10S 707/99933; Y10S 707/99936

USPC .................. 382/100, 181, 190, 224; 700/94; 704/231, 243, 245, 256, 270, 273, 704/E11.001, E11.002; 705/57; 707/737, 707/741, 747, 749, 752, 758, 769,
(Continued)

(56) References Cited

U.S. PATENT DOCUMENTS

| 6,393,450 B1 | 5/2002 | Whikehart |
| 6,453,252 B1 | 9/2002 | Laroche |
| 6,721,488 B1 | 4/2004 | Dimitrova et al. |

(Continued)

OTHER PUBLICATIONS

Nielsen, A. "Project Report: Onset Detection," Aarhus University, Feb. 4, 2010, 14 pages, Retrieved from the Internet <http://cs.au.dk/.about.grav/onset/>.

*Primary Examiner* — Duc Nguyen
*Assistant Examiner* — Alexander L Eljaiek
(74) *Attorney, Agent, or Firm* — Young Basile Hanlon & MacFarlane, P.C.

(57) ABSTRACT

Systems and methods are provided herein relating to audio matching. Interest points that are onsets are generally very efficient in audio matching in that they are robust to multiple types of distortion. Prominent onsets can be detected within an audio signal excerpt as interest points and combined as a function of a set of interest points to form a descriptor. Descriptors associated with an audio signal excerpt that contain a set of prominent onsets as interest points can be used in matching the audio signal excerpt to an audio reference. The benefits in generating and using prominent onsets within descriptors improve the accuracy of an audio matching system.

18 Claims, 11 Drawing Sheets

(58) Field of Classification Search
USPC ... 707/999.003, 999.006, E17.014, E17.101; 713/176, 180; 725/18, 19; 726/26
See application file for complete search history.

(56) References Cited

U.S. PATENT DOCUMENTS

| | | |
|---|---|---|
| 7,516,074 B2 | 4/2009 | Bilobrov |
| 7,809,580 B2 | 10/2010 | Hotho et al. |
| 8,488,800 B2 | 7/2013 | Crockett |
| 2002/0023020 A1 | 2/2002 | Kenyon et al. |
| 2002/0037083 A1* | 3/2002 | Weare ............... G06F 17/30038 381/58 |
| 2005/0104654 A1 | 5/2005 | Muhammad et al. |
| 2005/0273319 A1 | 12/2005 | Dittmar et al. |
| 2007/0282860 A1 | 12/2007 | Athineos et al. |
| 2008/0300702 A1* | 12/2008 | Gomez .................. G10L 25/48 700/94 |
| 2009/0012638 A1 | 1/2009 | Lou |
| 2013/0139673 A1* | 6/2013 | Ellis ........................ G10H 1/40 84/609 |
| 2013/0226850 A1* | 8/2013 | Hannuksela ............ G10L 25/48 706/14 |

* cited by examiner

AUDIO MATCHING USING TIME-FREQUENCY ONSETS

CROSS-REFERENCE TO RELATED APPLICATION

This application is a continuation of prior application Ser. No. 13/418,334, filed Mar. 12, 2012, which is incorporated herein by reference.

TECHNICAL FIELD

This application relates to audio matching, and more particularly to detecting time-frequency onsets and using the detected onsets to match an audio signal.

BACKGROUND

Audio samples can be recorded by many commercially available electronic devices such as smart phones, tablets, e-readers, computers, personal digital assistants, personal media players, etc. Audio matching provides for identification of a recorded audio sample by comparing the audio sample to a set of reference samples. To make the comparison, an audio sample can be transformed to a time-frequency representation of the sample by using, for example, a short time Fourier transform (STFT). Using the time-frequency representation, interest points that characterize time and frequency locations of peaks or other distinct patterns of the spectrogram can then be extracted from the audio sample. Fingerprints or descriptors can be computed as functions of sets of interest points. Fingerprints of the audio sample can then be compared to fingerprints of reference samples to determine identity of the audio sample.

Recorded audio signals can suffer from many types of distortion. A signal could suffer from noise distortion, pitch shift distortion, compression algorithm distortion, etc. These distortions will affect which interest points are selected. A fingerprint containing distorted interest points may prevent an audio signal from being matched with a fingerprint containing clean undistorted interest points of the same audio signal.

An audio matching system that is robust to distortion is desirable. By generating fingerprints of an audio sample containing interest points that are robust to distortion, the accuracy of an audio matching system relying on the generated fingerprints can be improved. Thus, effectively selecting interest points that are robust to distortion and generating fingerprints based on those interest points is desirable.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Systems and methods disclosed herein relate to audio matching. An input component can receive an audio signal excerpt. An extraction component can extract prominent onsets in the audio signal excerpt to facilitate generation of descriptors that are a set of time-frequency points that describe the prominent onsets in the audio signal excerpt.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Audio matching in general involves analyzing an audio sample for unique characteristics that can be used in comparison to unique characteristics of reference samples to identify the audio sample. As a starting point for this analysis, a spectrogram can be constructed of the audio signal. A spectrogram represents an audio sample by plotting time on one axis and frequency on another axis. Additionally, amplitude or intensity of a certain frequency at a certain time can also be incorporated into the spectrogram by using color or a third dimension.

There are several different techniques for creating a spectrogram. One technique involves using a series of band-pass filters that can filter an audio sample at a specific frequency and measure amplitude of the audio sample at that specific frequency over time. The audio sample can be run through additional filters to individually isolate a set of frequencies to measure the amplitude of the set over time. A spectrogram can be created by combining all the measurements over time on the frequency axis to generate a spectrogram image of frequency amplitudes over time.

A second technique involves using short-time Fourier transform ("STFT") to break down an audio sample into time windows, where each window is Fourier transformed to calculate a magnitude of the frequency spectrum for the duration of each window. Combining a plurality of windows side by side on the time axis of the spectrogram creates an image of frequency amplitudes over time. It can be appreciated that time windows can be overlapping. Other techniques, such as wavelet transforms, can also be used to construct a spectrogram.

Creating and storing in a database an entire spectrogram for a plurality of reference samples can require large amounts of storage space and affect scalability of an audio matching system. Therefore, it is desirable to instead calculate and store compact descriptors ("fingerprints") of reference samples versus an entire spectrogram. One method of calculating fingerprints is to first determine individual interest points that identify unique characteristics of local features of the time-frequency representation of the reference sample. Fingerprints can then be computed as functions of sets of interest points.

Calculating interest points involves identifying unique characteristics of the spectrogram. For example, an interest point could be a spectral peak of a specific frequency over a specific window of time. As another non-limiting example, an interest point could also include timing of the onset of a note. It is to be appreciated that conceivably any suitable spectral event over a specific duration of time could constitute an interest point.

Generating interest points corresponding to a time-frequency onset of a spectral event can provide benefits in that onsets can be highly robust to transformations such as noise distortion, pitch shift distortion, or compression distortion. An audio matching system based on generating descriptors containing time-frequency onsets can provide similar advantages in regards to more accurately identifying audio signals suffering from distortions.

Systems and methods herein provide for generating interest points that correspond to time-frequency onsets. A spectrogram can be generated based on an audio signal excerpt using STFTs on overlapping windows. A de-tilt can be applied by, for example, using a whitening technique or weighting STFT windows so that high frequency bins are weighted more than low frequency bins. A time-domain smoothing can be applied to each row of the spectrogram where rows correspond to frequency bands. A first-order difference or time derivative can be applied to each row where the difference in consecutive windows (e.g., a low value followed by a high value) can signify an onset. A mean can be subtracted from each column of the spectrogram where columns correspond to time bands. A second smoothing filter can then be applied. The maximum value for each time column can be compared to neighboring bins wherein if that maximum value is higher than the maxima in the two neighboring columns, it can signify an onset. Descriptors can then be generated as functions of sets of time-frequency onsets. It can be appreciated that other information related to characterizing the onset can be included in a descriptor, such as, for example, a duration or time span of the note relating to the onset, neighboring spectrogram energy levels, or other local features relating to the onset.

As discussed in greater detail below, various implementations provide for using descriptors containing time-frequency onsets as interest points in an audio matching system. An input component can receive an audio signal excerpt. An extraction component can extract prominent onsets in the audio signal excerpt to facilitate generation of descriptors that are sets of time-frequency data that describe the prominent onsets in the audio signal excerpt.

Figure 1:
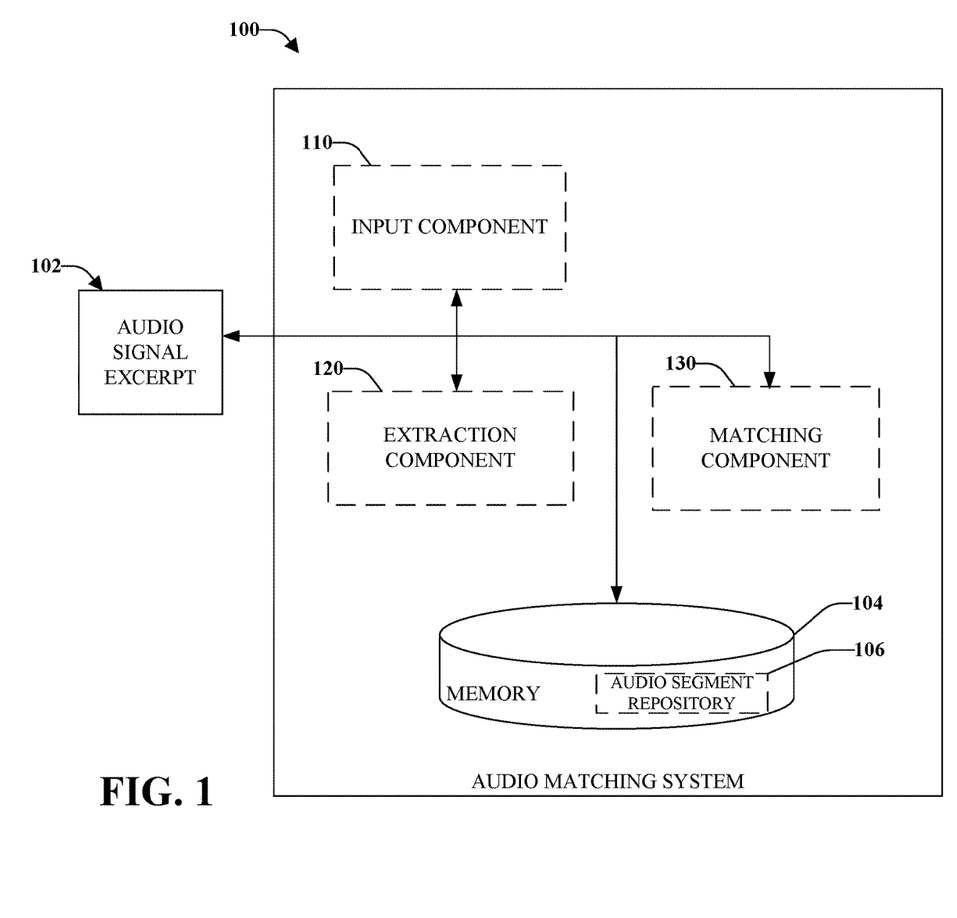
FIG. 1 a high-level functional block diagram of an example audio matching system using the detection of time-frequency onsets in accordance with implementations of this disclosure.

Referring to FIG. 1, there is illustrated a high-level functional block diagram of an example audio matching system using the detection of time-frequency onsets in accordance with implementations of this disclosure. Input component 110 can receive an audio signal excerpt 102. Extraction component 120 can extract prominent onsets in the audio signal excerpt 102 to facilitate generation of descriptors that are a set of time-frequency data that describe the prominent onsets in audio signal excerpt 102.

In one implementation, extraction component 120 can compute descriptors as a function of sets of interest points that are local features of a time-frequency data, the time-frequency data being a representation of the audio signal excerpt, such as, for example, a spectrogram. The function of sets of interest points can be STFTs.

In one implementation, extraction component 120 can extract prominent onsets that are robust to noise distortion, pitch shift distortion, compression distortions, or other distortions.

In one implementation, extraction component 120 can generate a spectrogram of audio signal excerpt 102 using STFTs on overlapping windows of the audio signal. For example, if a window of 10 milliseconds is chosen as a STFT window, then each window (e.g., a column when time is represented on a horizontal axis of the spectrogram) will overlap both a preceding window and a following window. It can be appreciated that in alternate implementations, differing window sizes can be employed.

In one implementation, extraction component 120 can apply a de-tilt to the spectrogram. Generally, there is more energy in lower frequency bands. Adjusting for this additional energy can aid in identifying time-frequency onsets. The de-tilt can be applied using a whitening technique such as, for example, using a whitening transform, or it can be applied by weighting STFT windows or bins such that high frequency bins are weighted more than lower frequency bins.

A matching component 130 that matches the audio signal excerpt to an audio signal stored in a repository to generate a set of potential audio matches wherein the matching component further employs the descriptors to identify a match of the audio signal excerpt to one of the potential audio matches among the set of potential audio matches as a function of overlap of prominent onsets. It can be appreciated that repository 106 can be disparately located from system 100. In one implementation, audio segment repository 106 can contain descriptors of audio segments. The descriptors can then be used by matching component 130 to match the audio signal excerpt 102. In one implementation, after receiving a set of potential matching reference signals based on the descriptors contained within audio segment repository 106, matching component 130 can match the audio signal excerpt 102 and the set of potential matching reference signals as a function of overlap of prominent onsets. The more overlap of prominent onsets, the more likely the audio signal excerpt 102 is a match for one of the potential matching reference signals in the set of potential matching reference signals.

Figure 2:
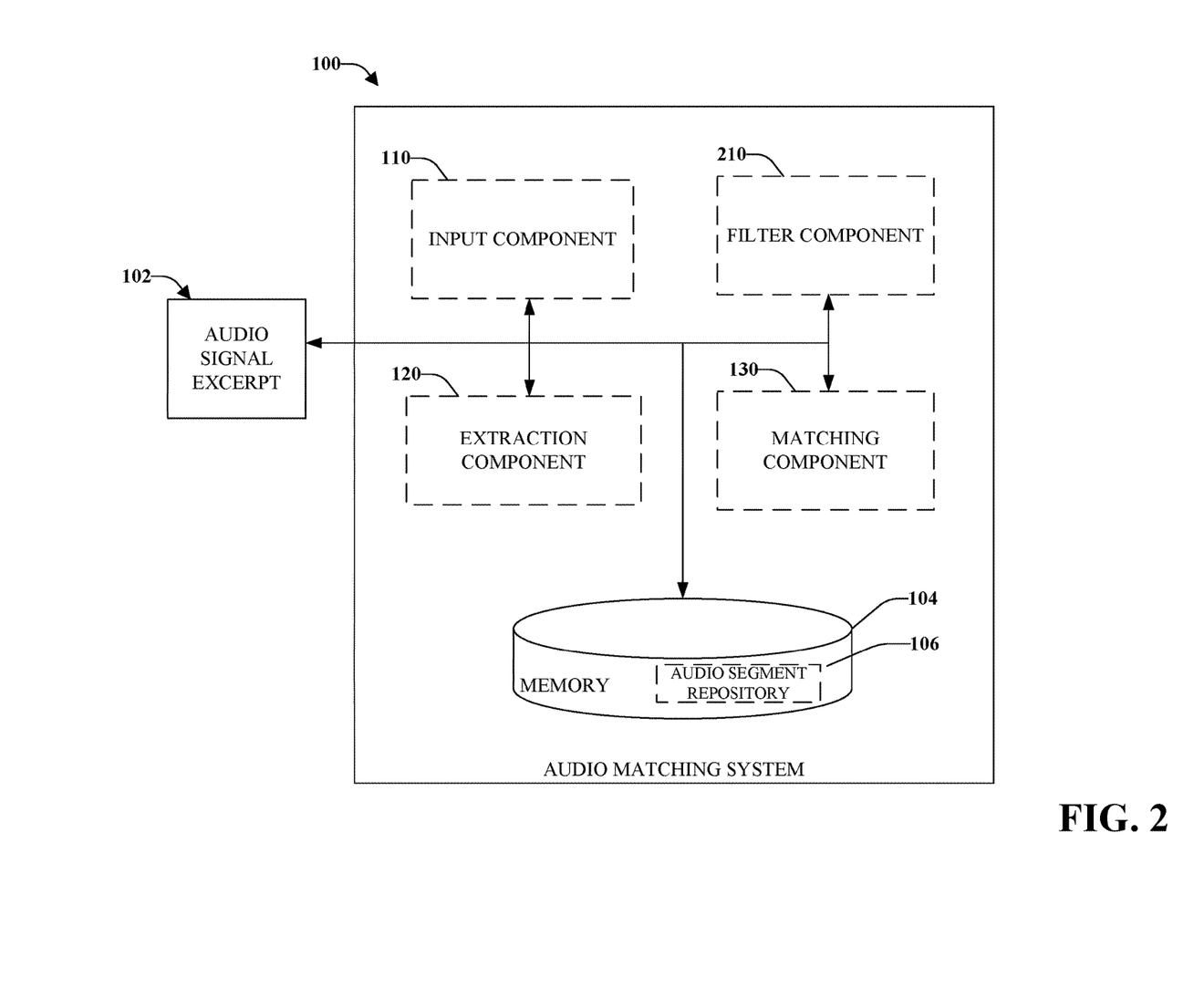
FIG. 2 illustrates a high-level functional block diagram of an example audio matching system using the detection of time-frequency onsets and a filter component in accordance with implementations of this disclosure.

Referring to FIG. 2, there is illustrated a high-level functional block diagram of an example audio matching system using the detection of time-frequency onsets including a filter component 210 that can emphasize onsets by performing a time-domain smoothing of each row of the spectrogram. In one implementation, rows of the spectrogram correspond to frequency bands. In one implementation, filter component 210 can emphasize fluctuations within a range of time scales associated with the prominent onsets.

In one implementation, filter component 210 can be a two-pole critically damped filter. A smoothing time constant can be selected, for example, 50 ms. It can be appreciated that in other implementations a different time constant can be selected and used in conjunction with a two-pole critically damped filter.

Figure 3:
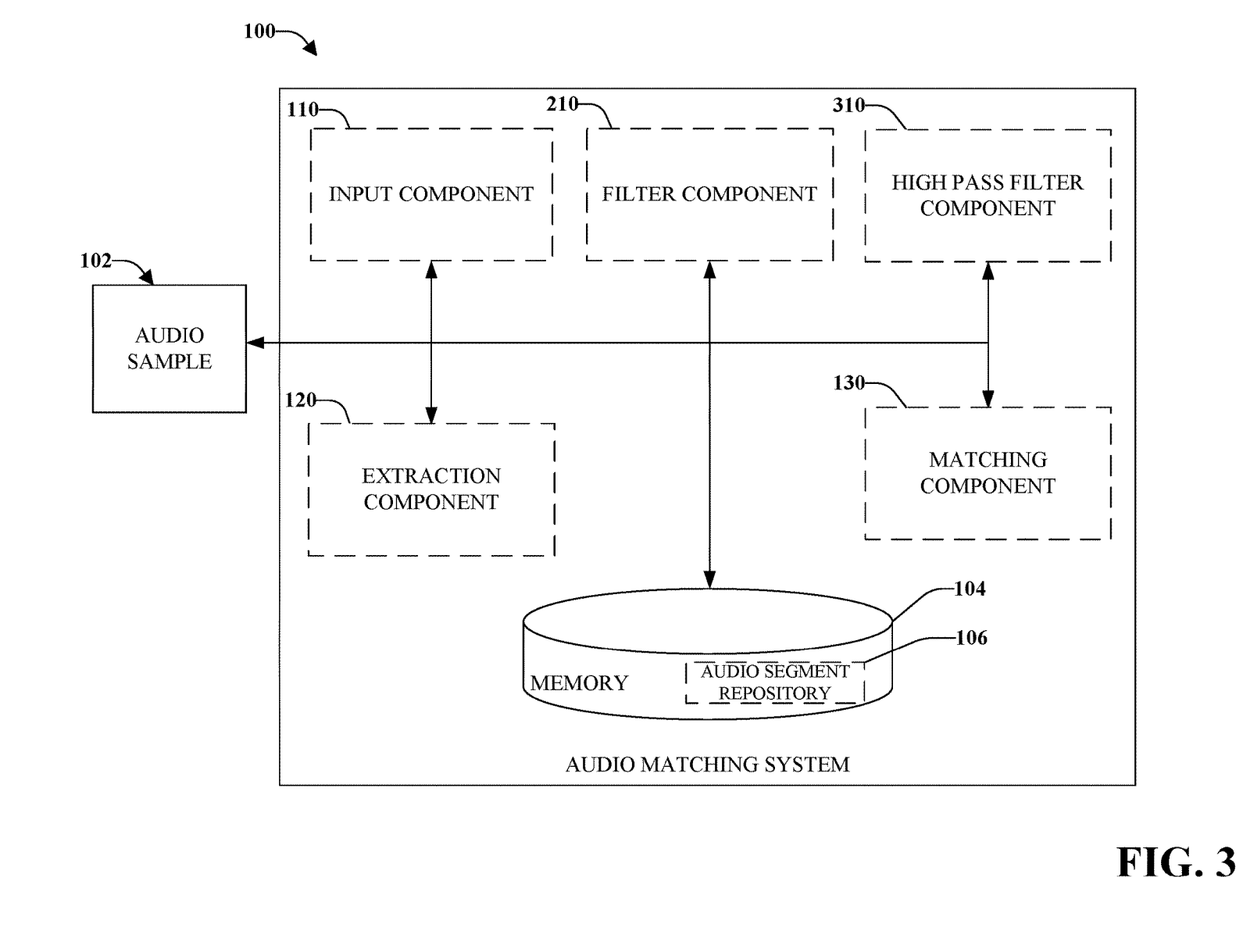
FIG. 3 illustrates a high-level functional block diagram of an example audio matching system using the detection of time-frequency onsets and a second filter component in accordance with implementations of this disclosure.

Referring to FIG. 3, there is illustrated a high-level functional block diagram of an example audio matching system using the detection of time-frequency onsets and a high pass filter component 310 that can perform a first-order difference on each row of the spectrogram or a time derivative on each row of the spectrogram. It can be appreciated that a large difference in consecutive time windows or bins, e.g., a low value followed by a high value, can be indicative of a time-frequency onset. In one implementation, high pass filter component 310 can subtract a mean from each spectrogram column. The mean can be the mean related to spectral activity over a certain number of windows or a specific time frame including over the duration of the entire audio signal excerpt. High pass filter component 310 can also apply a second time domain smoothing to the spectrogram. In another implementation, high pass filter component 310 can work in conjunction with filter component 210 to apply a second time domain smoothing to the spectrogram.

Figure 4:
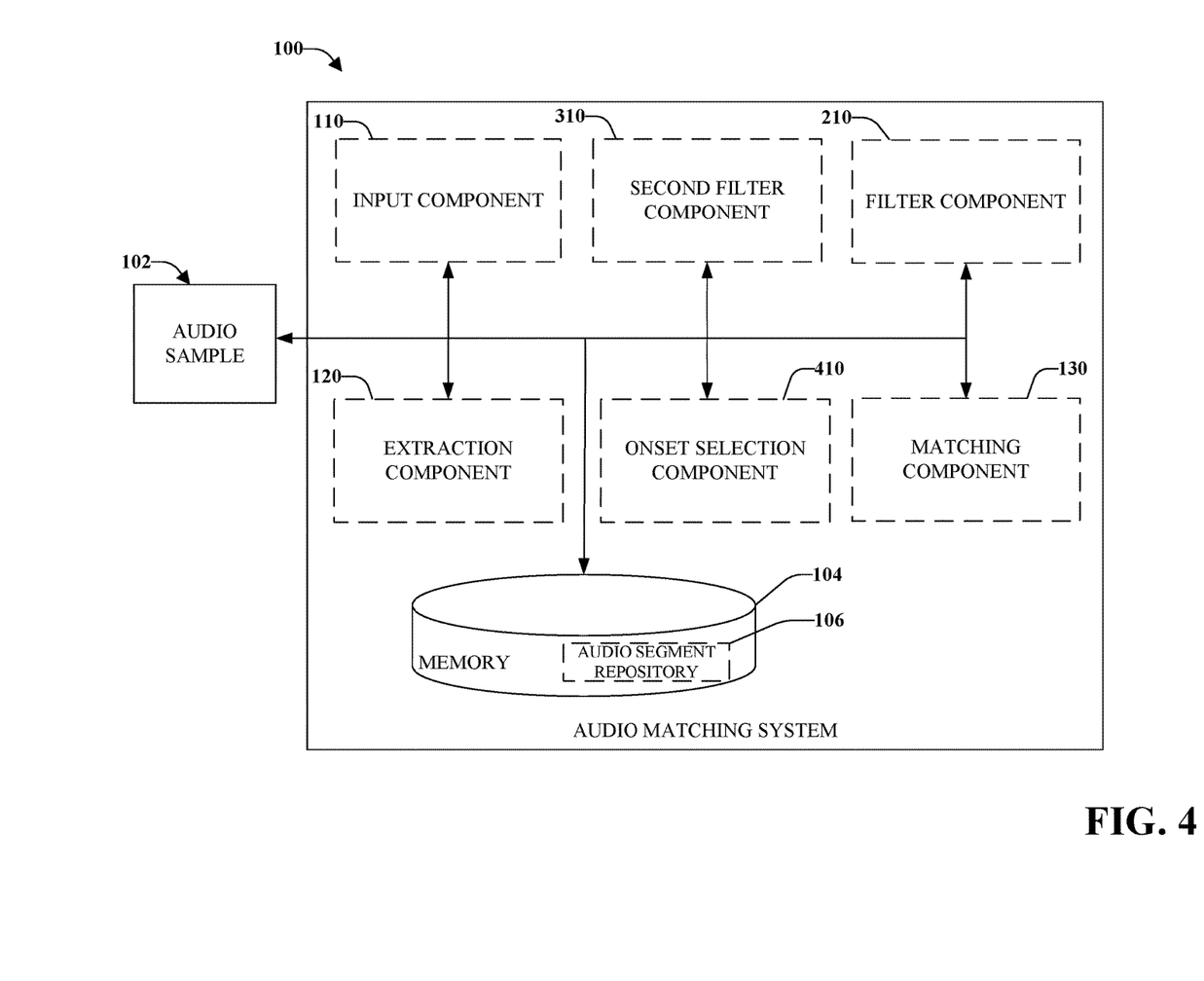
FIG. 4 illustrates a high-level functional block diagram of an example audio matching system using the detection of time-frequency onsets and a high pass filter component in accordance with implementations of this disclosure.

Referring to FIG. 4, there is illustrated a high-level functional block diagram of an example audio matching system using the detection of time-frequency onsets including an onset selection component 410 that can identify for each column or time step in the spectrogram a highest valued bin, and compare maxima in neighboring columns to identify prominent time-frequency onsets of the spectrogram. For example, if the maximum value of a time step (column) is higher than both neighboring time steps then it is likely a prominent time-frequency onset.

Figure 5:
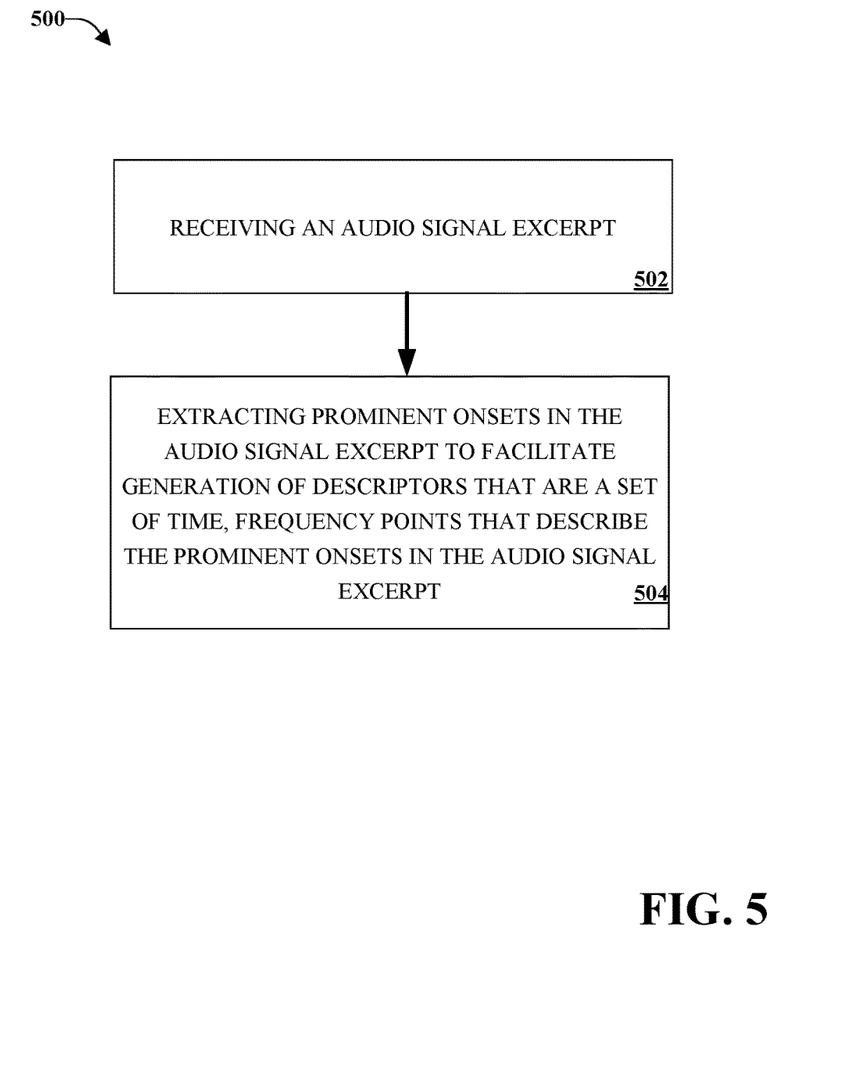
FIG. 5 illustrates an example method for audio matching using the detection of time-frequency onsets in accordance with implementations of this disclosure.
Figure 6:
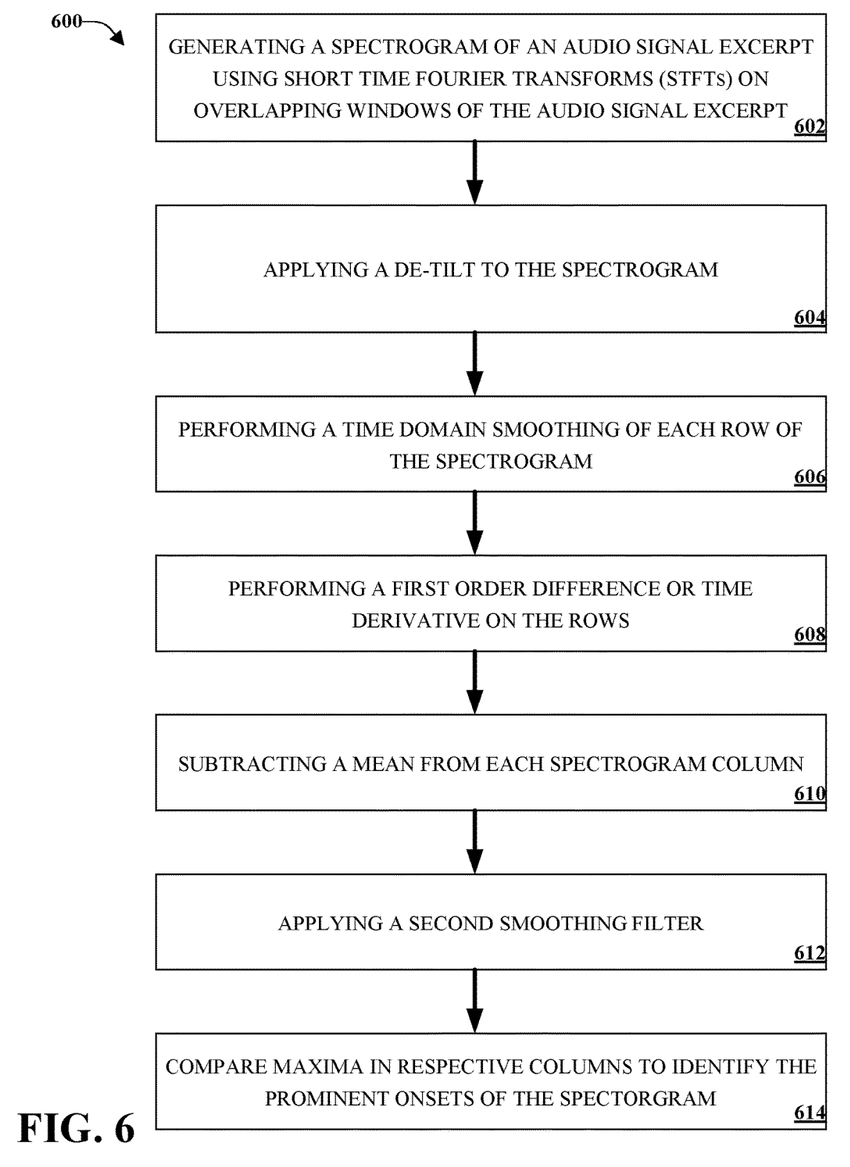
FIG. 6 illustrates an example method for detection of time-frequency onsets in accordance with implementations of this disclosure.
Figure 7:
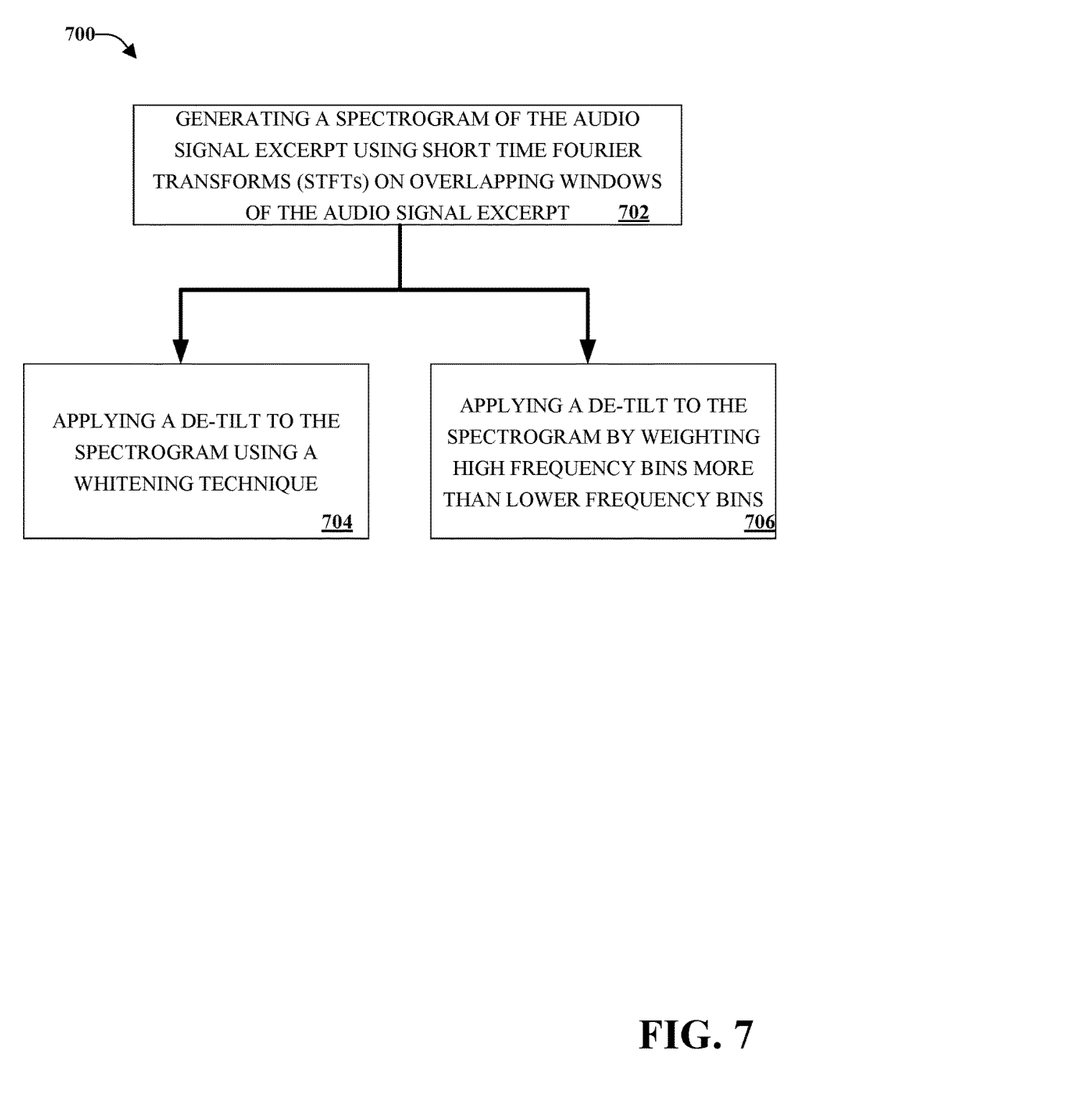
FIG. 7 illustrates an example method for applying a de-tilt to a spectrogram in accordance with implementations of this disclosure.

FIGS. 5-7 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with the following methods.

FIG. 5 illustrates an example method for audio matching using the detection of time-frequency onsets in accordance with implementations of this disclosure. At 502, an audio signal excerpt can be received (e.g., by an input component). At 504, prominent onsets in the audio signal excerpt can be extracted (e.g., by an extraction component) to facilitate generation of descriptors that are a set of time-frequency data that describe the prominent onsets in the audio signal excerpt.

FIG. 6 illustrates an example method for detection of time-frequency onsets in accordance with implementations of this disclosure. At 602, a spectrogram can be generated (e.g. by an input component) of an audio signal excerpt using STFTs on overlapping windows of the audio signal excerpt. At 604, a de-tilt can be applied (e.g., by an extraction component). At 606, a time domain smoothing can be performed (e.g., by a filter component). At 608 a first order difference or time derivative can be performed (e.g., by a high pass filter component) on each row of the spectrogram. It can be appreciated that a row can be a frequency band. At 610 a mean can be subtracted (e.g., by a high-pass filter component). At 612, a second smoothing filter can be applied (e.g., by a filter component). At 614, maxima in respective columns can be compared (e.g., by an onset selection component) to identify prominent onsets of the spectrogram.

FIG. 7 illustrates an example method for applying a de-tilt to a spectrogram in accordance with implementations of this disclosure. At 702, a spectrogram can be generated (e.g. by an input component) of an audio signal excerpt using STFTs on overlapping windows of the audio signal excerpt. At 704, a de-tilt can be applied (e.g., by an extraction component) to the spectrogram using a whitening technique. Alternatively, at 706, a de-tilt can be applied (e.g., by an extraction component) to the spectrogram by weighting high frequency bins more than lower frequency bins.

Figure 8:
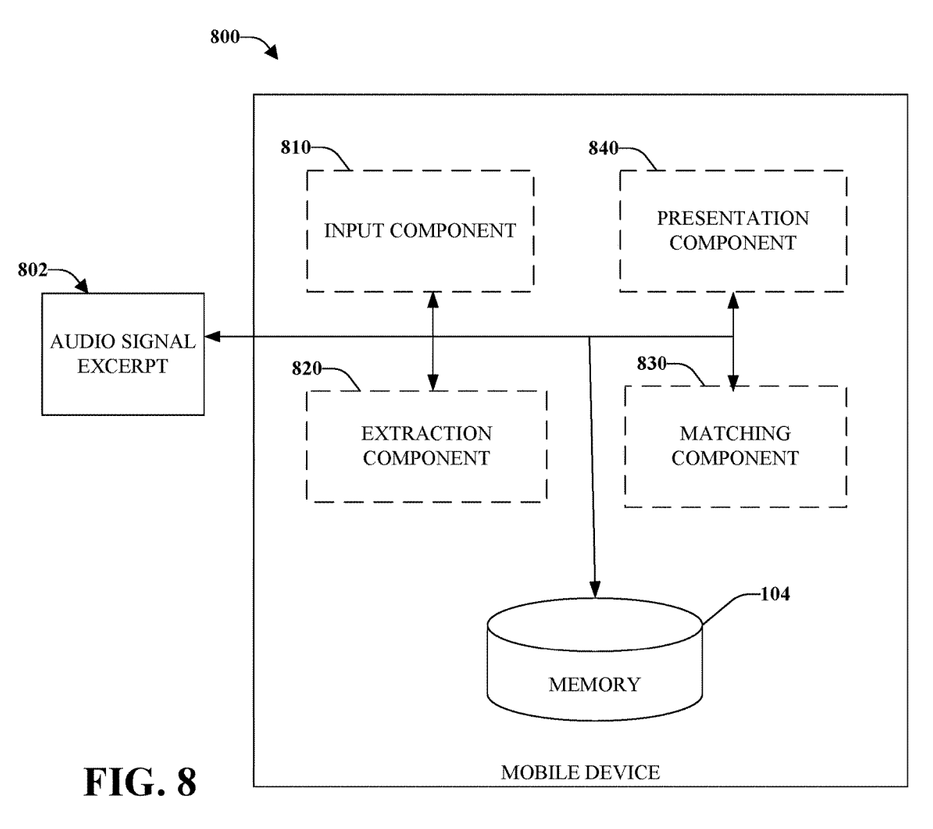
FIG. 8 illustrates a high-level functional block diagram of an example mobile device capable of matching an audio signal using the detection of time-frequency onsets in accordance with implementations of this disclosure.

Referring to FIG. 8, there is illustrated a high-level functional block diagram of an example mobile device capable of matching an audio signal using the detection of time-frequency onsets in accordance with implementations of this disclosure. An example of a mobile device can include smart phones, tablets, e-readers, computers, personal digital assistants, personal media players, etc. The mobile device can contain a microphone capable of receiving an audio signal. An input component 810 can receive an audio signal excerpt of the audio signal.

An extraction component 820 can extract prominent onsets in the audio signal excerpt to facilitate generation of descriptors that are a set of time-frequency data that describe the prominent onsets in the audio signal excerpt. A matching component 830 can employ the descriptors to identify a match of the audio signal excerpt. A presentation component 840 can notify a user of the mobile device identification of the matched audio file stored in the repository. For example, presentation component can display the identification on the mobile device, audibly identify the identification, send email identification to the user, send an SMS message regarding the identification to the user, etc.

Figure 9:
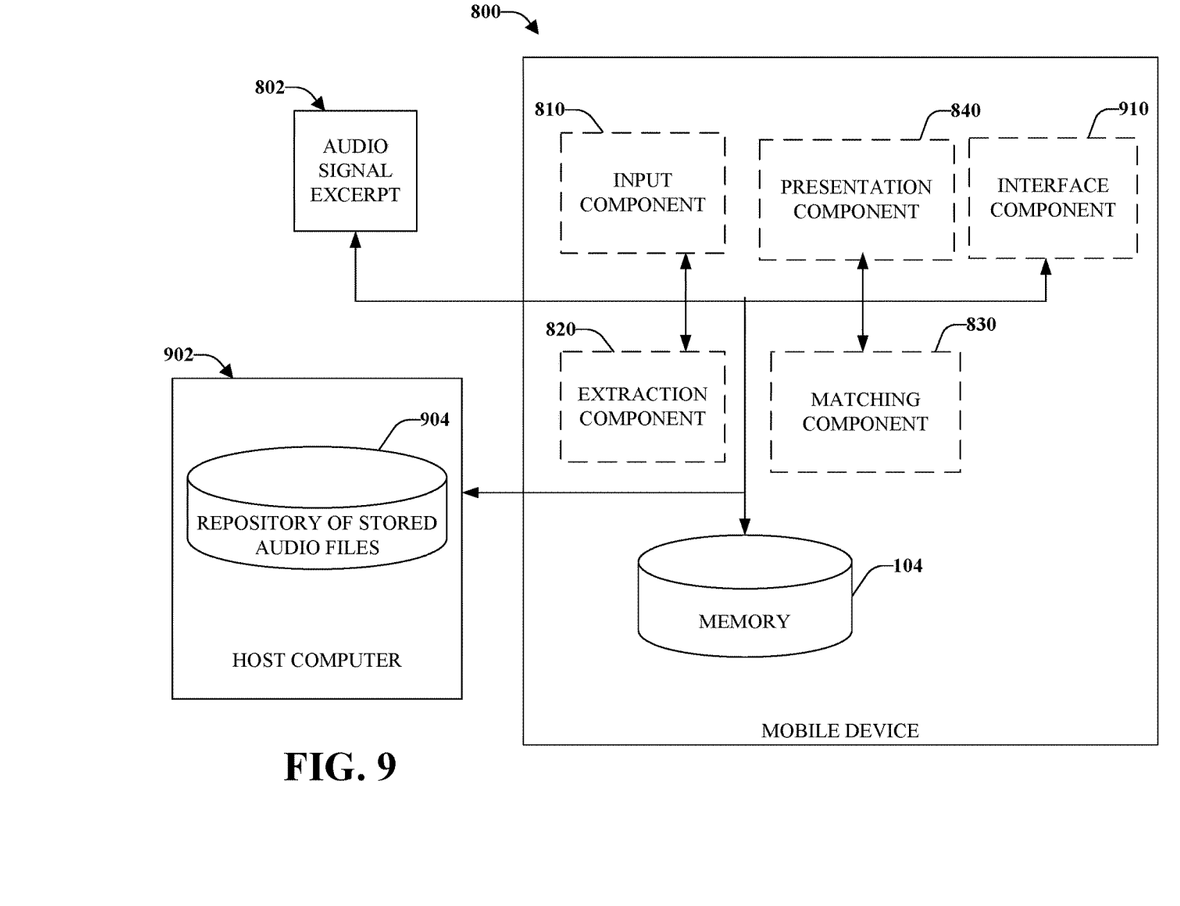
FIG. 9 illustrates a high-level functional block diagram of an example mobile device capable of matching an audio signal using the detection of time-frequency onsets including an interface component in accordance with implementations of this disclosure.

Referring to FIG. 9, there is illustrated a high-level functional block diagram of an example mobile device capable of matching an audio signal using the detection of time-frequency onsets including an interface component 910 that communicatively couples the matching component 830 to a repository of stored audio files 904, wherein the repository of stored audio files 904 is located within a host computer 902.

In one implementation, the matching component can perform the match by transmitting the descriptors to the host computer 802, wherein the host computer 802 matches the uploaded descriptors to a set of stored descriptors stored in the repository as a function of overlap of prominent onsets. It can be appreciated that the entirety of each reference audio sample need not be stored within the repository.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. A filter component can be hardware capable of filtering. Further, a "device" can come in the form of specially designed hardware; generalized hardware made specialized by the execution of software thereon that enables hardware to perform specific functions (e.g. generating interest points and/or fingerprints); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 10:
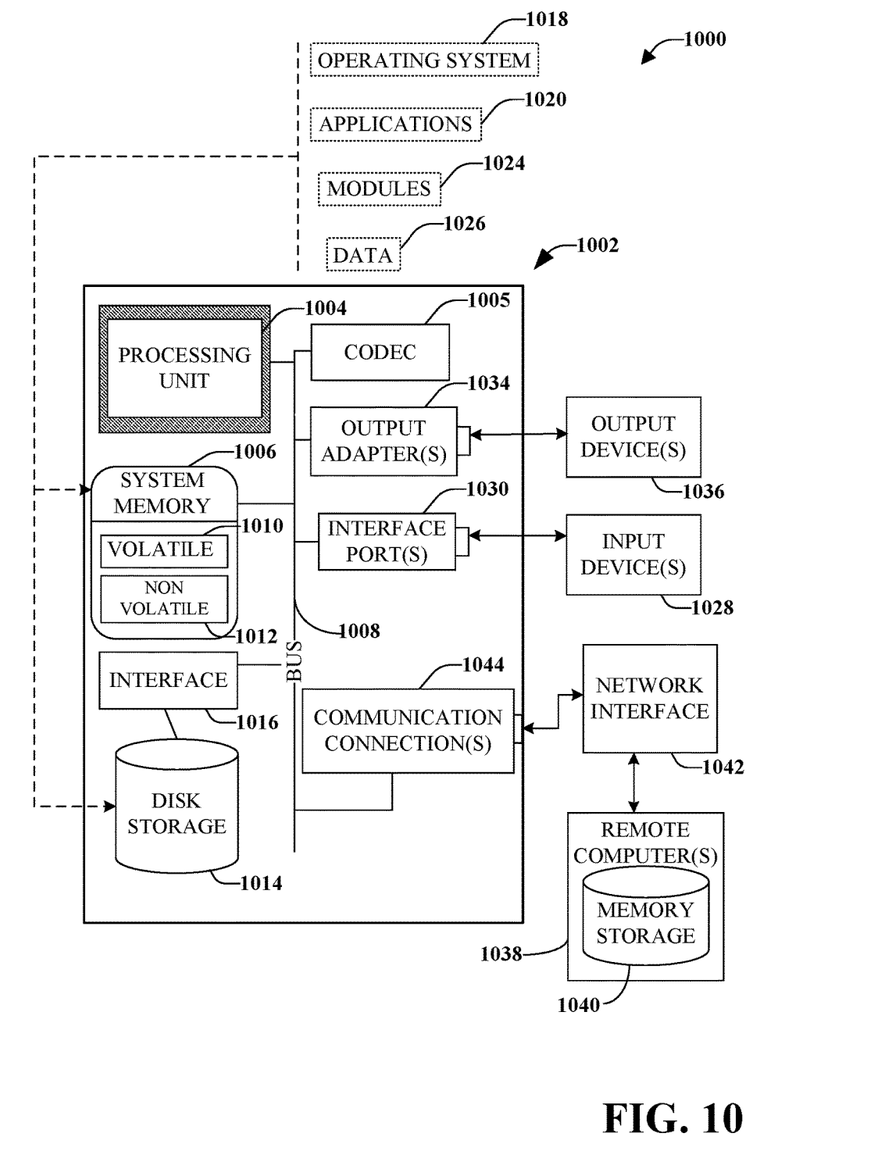
FIG. 10 illustrates an example block diagram of a computer operable to execute the disclosed architecture in accordance with implementations of this disclosure.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM).

Computer 1002 may also include removable/non-removable, volatile/non-volatile computer storage media. FIG. 10 illustrates, for example, a disk storage 1014. Disk storage 1014 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1014 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
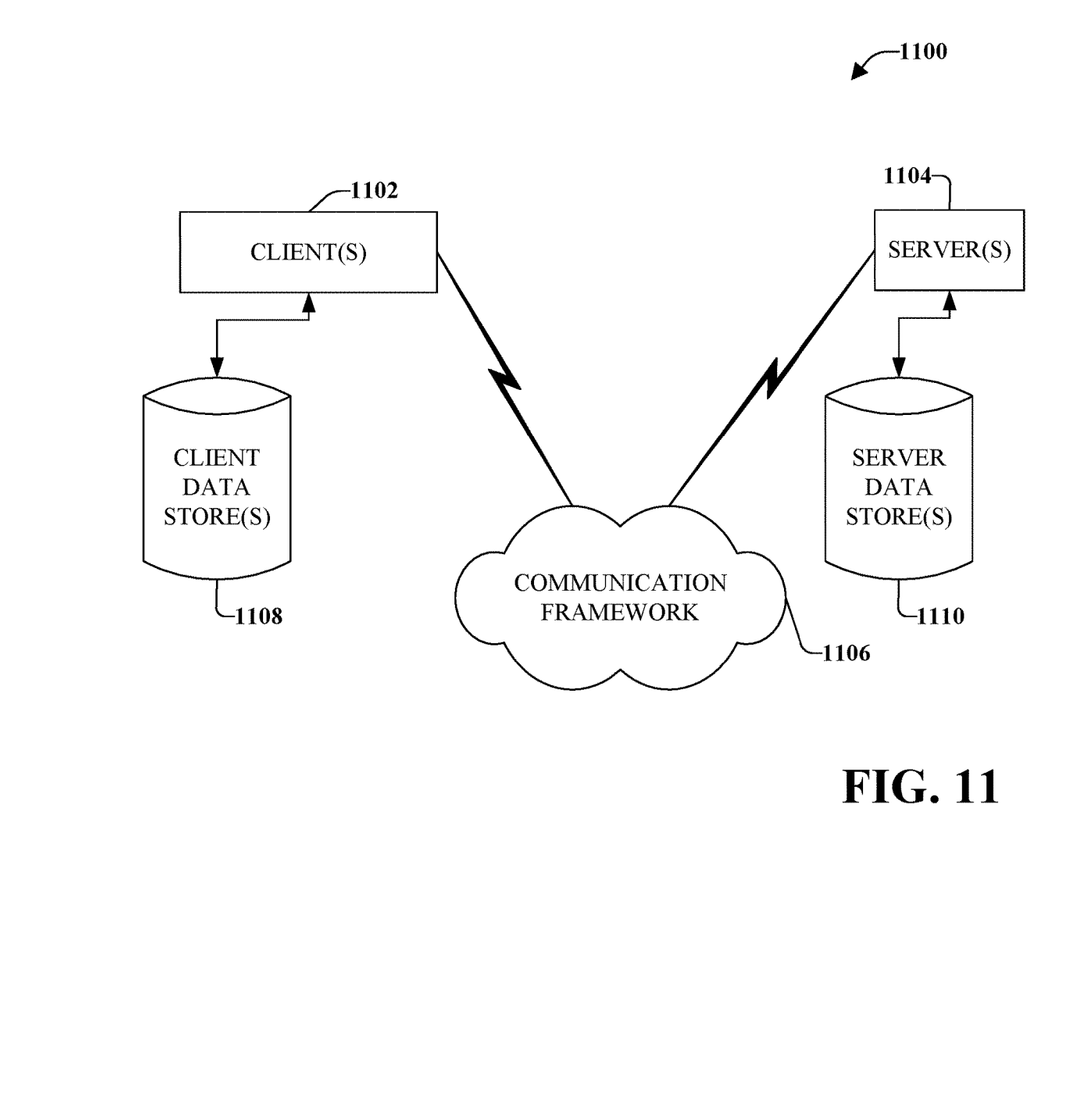
FIG. 11 illustrates an example schematic block diagram for a computing environment in accordance with implementations of this disclosure.

Referring now to FIG. 11, there is illustrated a schematic block diagram of a computing environment 1100 in accordance with the subject specification. The system 1100 includes one or more client(s) 1102, which can include an application or a system that accesses a service on the server 1104. The client(s) 1102 can be hardware and/or software (e.g., threads, processes, computing devices). The client(s) 1102 can house cookie(s), metadata, and/or associated contextual information by employing the specification, for example.

The system 1100 also includes one or more server(s) 1104. The server(s) 1104 can also be hardware or hardware in combination with software (e.g., threads, processes, computing devices). The servers 1104 can house threads to perform, for example, extracting, applying a de-tilt, performing time domain smoothing, performing time derivates, etc. in accordance with the subject disclosure. One possible communication between a client 1102 and a server 1104 can be in the form of a data packet adapted to be transmitted between two or more computer processes where the data packet contains, for example, an audio sample or descriptors associated with an audio sample. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method for audio matching that is robust to distortion in matched audio samples, comprising:
   receiving, from a user by a system including a processor, an audio signal excerpt;
   generating, by the system, using overlapping windows of the audio signal excerpt, a spectrogram of the audio signal excerpt using short time Fourier transforms (STFTs), wherein rows in the spectrogram represent frequencies and columns in the spectrogram represent times;
   applying, by the system, a smoothing filter to each row of the spectrogram to produce a smoothed spectrogram, wherein the smoothing filter is a time-domain smoothing filter;
   performing, by the system, a time derivative on each row of the smoothed spectrogram to produce a derived spectrogram;
   extracting, by the system, prominent onsets in the audio signal excerpt based on the derived spectrogram to facilitate generation of descriptors describing the prominent onsets in the audio signal excerpt, wherein a prominent onset of the prominent onsets is extracted by steps comprising:
      identifying, for a column in the derived spectrogram, a time column maximum corresponding to a highest value frequency bin of the column;
      comparing the time column maximum to respective maxima of each of neighboring columns of the column in the derived spectrogram,
         the neighboring columns consisting of a first time column that is adjacent to and to the right of the time column and a second time column that is adjacent to and to the left of the time column;
      only on condition that the time column maximum is higher than the respective maxima, identifying the time column maximum as the prominent onset; and
   generating a descriptor of the descriptors as a function of the prominent onset, wherein the descriptor comprises the prominent onsets;
   comparing the audio signal excerpt to a plurality of audio signals stored in a repository to generate a set of potential matches;
   identifying, using the descriptors, for the audio signal excerpt a potential match among the set of potential matches as a function of overlap of prominent onsets; and
   notifying the user of the potential match.

2. The method of claim 1, further comprising:
   subtracting, by the system, a mean from each spectrogram column of the derived spectrogram to produce a subtracted spectrogram, wherein the prominent onsets in the audio signal excerpt are extracted based on the subtracted spectrogram.

3. The method of claim 2, further comprising:
   Applying, by the system, a smoothing filter to the subtracted spectrogram to produce a smoothed spectrogram, wherein the prominent onsets in the audio signal excerpt are extracted based on the smoothed spectrogram.

4. The method of claim 1, wherein the descriptors are a function of sets of interest points that are local features of a time-frequency data, the time-frequency data being a representation of the audio signal excerpt.

5. The method of claim 1, further comprising emphasizing fluctuations within a range of time scales associated with the prominent onsets.

6. A system, comprising:
   a processor for executing computer program instructions; and
   a non-transitory computer readable storage medium storing instructions executable by the processor to perform steps comprising:
      receiving, from a user, an audio signal excerpt;
      generating a spectrogram of the audio signal excerpt using short time Fourier transforms (STFTs), wherein rows in the spectrogram represent frequencies and columns in the spectrogram represent times;
      performing a time derivative on each row of the spectrogram to produce a derived spectrogram;
      extracting prominent onsets in the audio signal excerpt based on the derived spectrogram to facilitate generation of descriptors describing the prominent onsets in the audio signal excerpt, wherein a prominent onset of the prominent onsets is extracted by steps comprising:
         identifying, for a column in the derived spectrogram, a time column maximum corresponding to a highest value frequency bin of the column;
         comparing the time column maximum to respective maxima of each of neighboring columns of the column in the derived spectrogram,
            the neighboring columns comprising a first time column that is adjacent to and to the right of the time column and a second time column that is adjacent to and to the left of the time column;
         only on condition that the time column maximum is higher than the respective maxima, identifying the time column maximum as a prominent onset; and generating a descriptor of the descriptors as a function of the prominent onset;

comparing the audio signal excerpt to a plurality of audio signals stored in a repository to generate a set of potential matches;

matching the audio signal excerpt to a potential match among the set of potential matches as a function of overlap of prominent onsets; and notifying the user of the potential match.

7. The system of claim 6, the steps further comprising:
applying a smoothing filter to each row of the spectrogram to produce a smoothed spectrogram, wherein the time derivative is performed on each row of the smoothed spectrogram.

8. The system of claim 6, the steps further comprising:
subtracting a mean from each spectrogram column of the derived spectrogram to produce a subtracted spectrogram, wherein the prominent onsets in the audio signal excerpt are extracted based on the subtracted spectrogram.

9. The system of claim 8, the steps further comprising:
applying a smoothing filter to the subtracted spectrogram to produce a smoothed spectrogram, wherein the prominent onsets in the audio signal excerpt are extracted based on the smoothed spectrogram.

10. The system of claim 6, wherein generating the spectrogram of the audio signal excerpt using the short time Fourier transforms (STFTs) comprises employing overlapping windows of the audio signal excerpt.

11. The system of claim 10, wherein the descriptors are a function of sets of interest points that are local features of a time-frequency data, the time-frequency data being a representation of the audio signal excerpt.

12. The system of claim 6, the steps further comprising emphasizing fluctuations within a range of time scales associated with the prominent onsets.

13. A non-transitory computer readable storage medium storing instructions executable by a processor to perform steps comprising:

receiving, from a user, an audio signal excerpt;

generating a spectrogram of the audio signal excerpt using short time Fourier transforms (STFTs), wherein rows in the spectrogram represent frequencies and columns in the spectrogram represent times;

performing a time derivative on each row of the spectrogram to produce a derived spectrogram;

extracting prominent onsets in the audio signal excerpt based on the derived spectrogram to facilitate generation of descriptors describing the prominent onsets in the audio signal excerpt, wherein a prominent onset of the prominent onsets is extracted by steps comprising:

identifying, for a column in the derived spectrogram, a time column maximum corresponding to a highest value frequency bin of the column;

comparing the time column maximum to respective maxima of each of neighboring columns of the column in the derived spectrogram, the neighboring columns comprising a first time column that is adjacent to and to the right of the time column and a second time column that is adjacent to and to the left of the time column;

only on condition that the time column maximum is higher than the respective maxima, identifying the time column maximum as a prominent onset; and generating a descriptor of the descriptors as a function of the prominent onset;

comparing the audio signal excerpt to a plurality of audio signals stored in a repository to generate a set of potential matches;

matching the audio signal excerpt to a potential match among the set of potential matches as a function of overlap of prominent onsets; and notifying the user of the potential match.

14. The computer readable storage medium of claim 13, the steps further comprising:
applying a smoothing filter to each row of the spectrogram to produce a smoothed spectrogram, wherein the time derivative is performed on each row of the smoothed spectrogram.

15. The computer readable storage medium of claim 13, the steps further comprising:
subtracting a mean from each spectrogram column of the derived spectrogram to produce a subtracted spectrogram, wherein the prominent onsets in the audio signal excerpt are extracted based on the subtracted spectrogram.

16. The computer readable storage medium of claim 15, the steps further comprising:
applying a smoothing filter to the subtracted spectrogram to produce a smoothed spectrogram, wherein the prominent onsets in the audio signal excerpt are extracted based on the smoothed spectrogram.

17. The computer readable storage medium of claim 13, wherein generating the spectrogram of the audio signal excerpt using the short time Fourier transforms (STFTs) comprises employing overlapping windows of the audio signal excerpt.

18. The computer readable storage medium of claim 17, wherein the descriptors are a function of sets of interest points that are local features of a time-frequency data, the time-frequency data being a representation of the audio signal excerpt.

* * * * *